(12) United States Patent
Doshi

(10) Patent No.: US 9,092,504 B2
(45) Date of Patent: Jul. 28, 2015

(54) CLUSTERED INFORMATION PROCESSING AND SEARCHING WITH STRUCTURED-UNSTRUCTURED DATABASE BRIDGE

(71) Applicant: Vivek Ventures, LLC, Cheyenne, WY (US)

(72) Inventor: Sundeep Doshi, Corte Madera, CA (US)

(73) Assignee: Vivek Ventures, LLC, Cheyenne, WY (US)

( * ) Notice: Subject to any disclaimer, the term of this patent is extended or adjusted under 35 U.S.C. 154(b) by 216 days.

(21) Appl. No.: 13/857,816

(22) Filed: Apr. 5, 2013

(65) Prior Publication Data

US 2013/0268532 A1   Oct. 10, 2013

Related U.S. Application Data

(60) Provisional application No. 61/736,464, filed on Dec. 12, 2012, provisional application No. 61/621,970, filed on Apr. 9, 2012.

(51) Int. Cl.
*G06F 17/30* (2006.01)

(52) U.S. Cl.
CPC .... *G06F 17/30598* (2013.01); *G06F 17/30424* (2013.01)

(58) Field of Classification Search
None
See application file for complete search history.

(56) References Cited

U.S. PATENT DOCUMENTS

| | | | |
|---|---|---|---|
| 6,038,560 A | 3/2000 | Wical | |
| 6,038,668 A | 3/2000 | Chipman et al. | |
| 6,292,894 B1 | 9/2001 | Chipman et al. | |
| 6,424,973 B1 | 7/2002 | Baclawski | |
| 6,453,312 B1 | 9/2002 | Goiffon | |
| 6,463,433 B1 | 10/2002 | Baclawski | |
| 6,675,159 B1 | 1/2004 | Lin et al. | |

(Continued)

FOREIGN PATENT DOCUMENTS

| | | |
|---|---|---|
| WO | 03094049 A2 | 11/2003 |
| WO | 2005017692 A2 | 2/2005 |

(Continued)

OTHER PUBLICATIONS

International Search Report and Written Opinion of the ISA for PCT/US2013/035512, filed Apr. 5, 2013. Report issued Jul. 31, 2013.

(Continued)

*Primary Examiner* — Hung Le
(74) *Attorney, Agent, or Firm* — PatantBest; Andrew McAleavey

(57) ABSTRACT

Systems and methods for indexing information and for performing searches are disclosed. In these systems and methods information is "ingested" into the system by clustering the information using a clustering algorithm such as k-means or k-medoids clustering. During the clustering process, a hybrid distance measurement is used that allows the systems and methods to determine similarity across a number of different types of information. Once the information is clustered, it is stored and "mirrored" both in a structured (e.g., relational) data repository and in an unstructured data repository. Methods according to the invention allow the retrieval of both direct search results and search results including related concepts. After clustered information is stored, future searches can be performed by searching the stored results in whichever data repository is most appropriate for the context.

11 Claims, 6 Drawing Sheets

(56) References Cited

U.S. PATENT DOCUMENTS

| | | |
|---|---|---|
| 6,701,314 B1 | 3/2004 | Conover et al. |
| 6,728,932 B1* | 4/2004 | Chundi et al. ............... 715/230 |
| 6,799,174 B2 | 9/2004 | Chipman et al. |
| 7,027,974 B1 | 4/2006 | Busch et al. |
| 7,089,237 B2 | 8/2006 | Turnbull et al. |
| 7,117,207 B1 | 10/2006 | Kerschberg et al. |
| 7,225,183 B2 | 5/2007 | Gardner |
| 7,272,595 B2 | 9/2007 | Tsuchitani et al. |
| 7,305,380 B1 | 12/2007 | Hoelzle et al. |
| 7,412,440 B2 | 8/2008 | Mori et al. |
| 7,426,499 B2 | 9/2008 | Eder et al. |
| 7,496,593 B2 | 2/2009 | Gardner et al. |
| 7,526,425 B2 | 4/2009 | Marchisio et al. |
| 7,530,105 B2 | 5/2009 | Gilbert et al. |
| 7,542,969 B1 | 6/2009 | Rappaport et al. |
| 7,555,478 B2 | 6/2009 | Bayley et al. |
| 7,562,069 B1 | 7/2009 | Chowdhury et al. |
| 7,567,915 B2 | 7/2009 | Hammitt et al. |
| 7,668,825 B2 | 2/2010 | Vogel et al. |
| 7,693,830 B2 | 4/2010 | Guha |
| 7,702,645 B2 | 4/2010 | Khushraj et al. |
| 7,707,220 B2 | 4/2010 | Bonabeau et al. |
| 7,716,209 B1 | 5/2010 | Rappaport et al. |
| 7,739,104 B2 | 6/2010 | Berkan et al. |
| 7,747,601 B2 | 6/2010 | Cooper et al. |
| 7,774,388 B1 | 8/2010 | Runchey |
| 7,783,668 B2 | 8/2010 | Vogel et al. |
| 7,792,836 B2 | 9/2010 | Taswell |
| 7,814,085 B1 | 10/2010 | Pfleger et al. |
| 7,827,125 B1 | 11/2010 | Rennison |
| 7,836,077 B2 | 11/2010 | Azvine et al. |
| 7,870,117 B1 | 1/2011 | Rennison |
| 7,904,445 B2 | 3/2011 | Adelman et al. |
| 7,917,492 B2 | 3/2011 | Bargeron et al. |
| 7,930,314 B2* | 4/2011 | Gupta ............... 707/769 |
| 7,945,579 B1 | 5/2011 | Tong et al. |
| 7,949,676 B2 | 5/2011 | Mori et al. |
| 7,953,746 B1 | 5/2011 | Garg et al. |
| 7,953,750 B1* | 5/2011 | Gupta ............... 707/769 |
| 7,962,469 B1 | 6/2011 | Hoelzle et al. |
| 7,996,393 B1 | 8/2011 | Nanno et al. |
| 8,001,064 B1 | 8/2011 | Rennison |
| 8,005,842 B1 | 8/2011 | Pasca et al. |
| 8,027,549 B2 | 9/2011 | Podilchuk |
| 8,041,702 B2 | 10/2011 | Eggebraaten et al. |
| 8,055,597 B2 | 11/2011 | Acharya |
| 8,055,669 B1 | 11/2011 | Singhal et al. |
| 8,065,316 B1 | 11/2011 | Baker et al. |
| 8,108,423 B2 | 1/2012 | Treat et al. |
| 8,131,757 B2 | 3/2012 | Haley et al. |
| 8,135,669 B2 | 3/2012 | Olstad et al. |
| 8,135,730 B2 | 3/2012 | Lim et al. |
| 8,140,535 B2 | 3/2012 | Eggebraaten et al. |
| 8,145,618 B1 | 3/2012 | Pfleger et al. |
| 8,155,946 B2 | 4/2012 | Hudson et al. |
| 8,166,021 B1 | 4/2012 | Cao et al. |
| 8,195,637 B1 | 6/2012 | Datar et al. |
| 8,204,891 B2 | 6/2012 | Thompson et al. |
| 8,209,331 B1 | 6/2012 | Garg et al. |
| 8,214,361 B1 | 7/2012 | Sandler et al. |
| 8,229,959 B1 | 7/2012 | Yagnik |
| 8,255,347 B2 | 8/2012 | Ellingsworth |
| 8,280,886 B2 | 10/2012 | Labrou et al. |
| 8,509,525 B1* | 8/2013 | Urbach et al. ............... 382/159 |
| 2004/0044659 A1 | 3/2004 | Judd et al. |
| 2004/0059723 A1 | 3/2004 | Hasegawa et al. |
| 2004/0103090 A1 | 5/2004 | Dogl et al. |
| 2004/0181389 A1 | 9/2004 | Bourigault et al. |
| 2005/0065773 A1 | 3/2005 | Huang et al. |
| 2005/0065774 A1 | 3/2005 | Doganata et al. |
| 2005/0080781 A1 | 4/2005 | Ryan et al. |
| 2005/0125400 A1 | 6/2005 | Mori et al. |
| 2005/0131649 A1 | 6/2005 | Larsen et al. |
| 2005/0138018 A1 | 6/2005 | Sakai et al. |
| 2005/0146951 A1 | 7/2005 | Horai et al. |
| 2005/0267871 A1 | 12/2005 | Marchisio et al. |
| 2005/0278164 A1 | 12/2005 | Hudson et al. |
| 2005/0278725 A1 | 12/2005 | Kawamura et al. |
| 2006/0020444 A1 | 1/2006 | Cousineau et al. |
| 2006/0020447 A1 | 1/2006 | Cousineau et al. |
| 2006/0020465 A1 | 1/2006 | Cousineau et al. |
| 2006/0036633 A1 | 2/2006 | Chong et al. |
| 2006/0165040 A1 | 7/2006 | Rathod et al. |
| 2006/0167928 A1 | 7/2006 | Chakraborty et al. |
| 2007/0067279 A1 | 3/2007 | Bonabeau et al. |
| 2007/0106499 A1 | 5/2007 | Dahlgren et al. |
| 2007/0130112 A1 | 6/2007 | Lin |
| 2007/0156669 A1 | 7/2007 | Marchisio et al. |
| 2007/0174041 A1 | 7/2007 | Yeske |
| 2007/0208726 A1 | 9/2007 | Krishnaprasad et al. |
| 2007/0214158 A1 | 9/2007 | Kamen |
| 2007/0286528 A1 | 12/2007 | Podilchuk |
| 2008/0027917 A1 | 1/2008 | Mukherjee et al. |
| 2008/0082502 A1* | 4/2008 | Gupta ............... 707/3 |
| 2008/0091633 A1 | 4/2008 | Rappaport et al. |
| 2008/0114738 A1 | 5/2008 | Chao |
| 2008/0133479 A1 | 6/2008 | Zelevinsky et al. |
| 2008/0133585 A1 | 6/2008 | Vogel et al. |
| 2008/0189269 A1 | 8/2008 | Olsen et al. |
| 2008/0195601 A1 | 8/2008 | Ntoulas et al. |
| 2008/0270384 A1 | 10/2008 | Tak |
| 2008/0288442 A1 | 11/2008 | Feigenbaum et al. |
| 2008/0294622 A1 | 11/2008 | Kanigsberg et al. |
| 2008/0313229 A1 | 12/2008 | Taswell |
| 2009/0019020 A1 | 1/2009 | Dhillon et al. |
| 2009/0070346 A1* | 3/2009 | Savona et al. ............... 707/100 |
| 2009/0076839 A1 | 3/2009 | Abraham-Fuchs et al. |
| 2009/0077024 A1 | 3/2009 | Abraham-Fuchs et al. |
| 2009/0077094 A1 | 3/2009 | Bodain |
| 2009/0106217 A1 | 4/2009 | Eggebraaten et al. |
| 2009/0112838 A1 | 4/2009 | Eggebraaten et al. |
| 2009/0164441 A1 | 6/2009 | Cheyer |
| 2009/0187548 A1 | 7/2009 | Ji et al. |
| 2009/0222444 A1 | 9/2009 | Chowdhury et al. |
| 2009/0271179 A1 | 10/2009 | Marchisio et al. |
| 2009/0319295 A1 | 12/2009 | Kass-Hout et al. |
| 2010/0036797 A1 | 2/2010 | Wong et al. |
| 2010/0076984 A1 | 3/2010 | Papadopoullos et al. |
| 2010/0161441 A1 | 6/2010 | Hounsell |
| 2010/0174754 A1 | 7/2010 | B'Far et al. |
| 2010/0185700 A1 | 7/2010 | Bodain |
| 2010/0205167 A1 | 8/2010 | Tunstall-Pedoe et al. |
| 2010/0211558 A1 | 8/2010 | Bonabeau et al. |
| 2010/0268700 A1 | 10/2010 | Wissner et al. |
| 2010/0268702 A1 | 10/2010 | Wissner et al. |
| 2010/0280989 A1 | 11/2010 | Mehra et al. |
| 2010/0287049 A1 | 11/2010 | Rousso et al. |
| 2010/0299336 A1 | 11/2010 | Bergstraesser et al. |
| 2010/0332217 A1 | 12/2010 | Wintner et al. |
| 2010/0332475 A1* | 12/2010 | Birdwell et al. ............... 707/737 |
| 2011/0004588 A1 | 1/2011 | Leitersdorf et al. |
| 2011/0004628 A1 | 1/2011 | Armstrong et al. |
| 2011/0029514 A1 | 2/2011 | Kerschberg et al. |
| 2011/0040766 A1 | 2/2011 | Robinson et al. |
| 2011/0040768 A1 | 2/2011 | Shon et al. |
| 2011/0047149 A1 | 2/2011 | Vaananen |
| 2011/0055188 A1 | 3/2011 | Gras |
| 2011/0078129 A1 | 3/2011 | Chunilal |
| 2011/0087685 A1 | 4/2011 | Lin et al. |
| 2011/0119243 A1 | 5/2011 | Diamond et al. |
| 2011/0153613 A1 | 6/2011 | Lee |
| 2011/0196852 A1 | 8/2011 | Srikanth et al. |
| 2011/0202526 A1 | 8/2011 | Lee et al. |
| 2011/0208710 A1 | 8/2011 | Lesavich |
| 2011/0208776 A1 | 8/2011 | Lee et al. |
| 2011/0208822 A1 | 8/2011 | Rathod |
| 2011/0213796 A1 | 9/2011 | Kiyota et al. |
| 2011/0219441 A1 | 9/2011 | Garg et al. |
| 2011/0231395 A1 | 9/2011 | Vadlamani et al. |
| 2011/0238693 A1 | 9/2011 | Seok et al. |
| 2011/0264680 A1 | 10/2011 | Lahr et al. |
| 2011/0270820 A1 | 11/2011 | Agarwal |
| 2011/0282879 A1 | 11/2011 | Bargeron et al. |
| 2011/0302156 A1 | 12/2011 | Vadlamani et al. |

(56) References Cited

U.S. PATENT DOCUMENTS

| | | |
|---|---|---|
| 2011/0320491 A1 | 12/2011 | Jung et al. |
| 2011/0320505 A1 | 12/2011 | Jung et al. |
| 2012/0054204 A1 | 3/2012 | Agarwal et al. |
| 2012/0130972 A1 | 5/2012 | Ahn et al. |
| 2012/0131008 A1 | 5/2012 | Ahn et al. |
| 2012/0158633 A1 | 6/2012 | Eder |
| 2012/0158691 A1 | 6/2012 | Yang et al. |
| 2012/0203752 A1 | 8/2012 | Ha-Thuc et al. |
| 2012/0209853 A1* | 8/2012 | Desai et al. ............ 707/741 |
| 2012/0254917 A1 | 10/2012 | Burkitt et al. |
| 2012/0259856 A1 | 10/2012 | Gehrking et al. |
| 2012/0259882 A1 | 10/2012 | Thakur et al. |

FOREIGN PATENT DOCUMENTS

| | | |
|---|---|---|
| WO | 2005081129 A1 | 9/2005 |
| WO | 2006068872 A2 | 6/2006 |
| WO | 2006073810 A2 | 7/2006 |
| WO | 2006083958 A2 | 8/2006 |
| WO | 2006104683 A2 | 10/2006 |
| WO | 2006116273 A2 | 11/2006 |
| WO | 2007041343 A2 | 4/2007 |
| WO | 2007143706 A2 | 12/2007 |
| WO | 2008027503 A2 | 3/2008 |
| WO | 2008113045 A1 | 9/2008 |
| WO | 2009010282 A1 | 1/2009 |
| WO | 2010022378 A1 | 2/2010 |
| WO | 2010082207 A1 | 7/2010 |
| WO | 2010092375 A1 | 8/2010 |
| WO | 2010120925 A2 | 10/2010 |
| WO | 2010120929 A2 | 10/2010 |
| WO | 2010128711 A1 | 11/2010 |
| WO | 2011053755 A1 | 5/2011 |
| WO | 2012042447 A2 | 4/2012 |
| WO | 2012050268 A1 | 4/2012 |
| WO | 2012108608 A1 | 8/2012 |
| WO | 2012131430 A1 | 10/2012 |

OTHER PUBLICATIONS

Alani, H. et al., "Automatic Ontology-Based Knowledge Extraction from Web Documents," IEEE Intelligent Systems, vol. 18, No. 1, pp. 14-21, 2003.

"Baazaoui, H. et al., "Model-Driven Approach of Ontological Component," Journal of Web Engineering, vol. 6, No. 4, pp. 303-329, 2007."

Bhogal, J. et al., "A Review of Ontology Based Query Expansion," Information Processing & Management, vol. 43, No. 4, pp. 866-886, 2007.

Bonino, D. et al., "Ontology Driven Semantic Search," Thesis. Politecnico di Torino, 2004.

Chen, Y. et al., "A Semantic-Aware Algorithm to Rank Concepts in an OWL Ontology Graph." Information Technology Journal, vol. 9, No. 4, pp. 825-831, 2010.

Chuang, S. et al., "Enriching Web Taxonomies through Subject Categorization of Query Terms from Search Engine Logs," Decision Support Systems, vol. 35, No. 1, pp. 113-127, 2003.

Codd, E.F., A Relational Model of Data for Large Shared Data Banks, Communications of the ACM vol. 13, No. 6, Jun. 1970.

Dai, Q., "Improving Rank Algorithm of Search Engine with Ontology and Categorization," Thesis, University of South Australia, 2009.

Dean, J. and Ghemawat, S., "MapReduce: Simplified Data Processing on Large Clusters," Google, Inc., 2004.

Diaz-Galiano, M. et al., "Query Expansion with a Medical Ontology to Improve a Multimodal Information Retrieval System," Computers in Biology and Medicine, vol. 39, No. 4, pp. 396-403, 2009.

Fensel, D. et al., "OIL: Ontology Infrastructure to Enable the Semantic Web," IEEE Intelligent Systems, vol. 16, No. 2, pp. 38-45, 2001.

Ferragina, P. et al., "A Personalized Search Engine-Based on Web-Snippet Hierarchal Clustering," Proceedings of the 14th International Conference on World Wide Web, ACM Press, pp. 801-810, 2005.

Gauch, S. et al., "Ontology based personalized search." Tools with Artificial Intelligence, Proceedings 11th IEEE International Conference on Tools with Artificial Intelligence, pp. 391-398, 1999.

Goh, K., et al., Proceedings of the National Academy of Sciences, vol. 104, pp. 8685-8690, 2007.

Hu, Y. et al., "Agricultural Market Name Geo-Locating System Based on an Administrative Ontology and Web Search Engine." Journal of Integrative Agriculture, vol. 11, No. 5, pp. 849-857, 2012.

Jiang, X. et al., "Learning and Inferencing in User Ontology for Personalized Semantic Web Services," Proceedings of the 12th International World Wide Web Conference, 2003.

Jones, C. et al., "The SPIRIT Spatial Search Engine: Architecture, Ontologies and Spatial Indexing," Proceedings of the 3rd International Conference on Geographic Information Science, pp. 125-139, 2004.

Jonquet, C. et al., "NCBO Resource Index: Ontology-Based Search and Mining of Biomedical Resources," Web Semantics: Science, Services and Agents on the World Wide Web, vol. 9, No. 3, pp. 316-324, 2011.

Kara, S. et al., "An Ontology-based Retrieval System Using Semantic Indexing," Information Systems, vol. 37, No. 4, pp. 294-305, 2012.

Leung, K. et al. "Deriving Concept-Based User Profiles from Search Engine Logs." Institute of Electrical and Electronics Engineers, Transactions on Knowledge and Data Engineering, vol. 22, No. 7, pp. 969-982, 2010.

Lim, E. et al., "Web Mining—The Ontology Approach," Proceedings of the International Advanced Digital Library Conference, Japan, 2005.

Makala, E. et al., "OntoViews—A Tool for Creating Semantic Web Portals," Proceedings of the Third International Semantic Web Conference, Springer Verlag, 2004.

Milne, D. et al., "A Knowledge-Based Search Engine Powered by Wikipedia," Proceedings of the 16th ACM Conference Information and Knowledge Management, pp. 445-454, 2007.

Moskovitch, R. et al., "Vaidurya: A Multiple-Ontology, Concept-Based, Context-sensitive Clinical-Guideline Search Engine," Journal of Biomedical Informatics, vol. 42, No. 1, pp. 11-21, 2009.

Munir, K. et al., "Ontology-Driven Relational Query Formulation Using the Semantic and Assertional Capabilities of Owl-Dl," Knowledge-Based Systems vol. 35, pp. 144-159, 2012.

Mustapha, N. et al., "Combining Semantic Search and Ontology Learning for Incremental Web Ontology Engineering," Sixth International Workshop on Web Information Systems Modeling, Ireland, 2009.

Mylonas, Ph., D. Vallet, P. Castells, M. Fernández, and Y. Avrithis. "Personalized Information Retrieval Based on Context and Ontological Knowledge." The Knowledge Engineering Review, vol. 23, No. 01, pp. 73-100, 2008.

Nagendra, M. et al., "Semantic Based XML Context Driven Search and Retrieval System," International Journal of Computational Engineering Reseach, vol. 2, No. 6, pp. 225-231, 2012.

Navigli, R. et al., "An Analysis of Ontology-based Query Expansion Strategies," Proceedings of the International Workshop & Tutorial on Adaptive Text Extraction and Mining, Croatia, 2003.

Pirro, G. et al., "UFOme: An Ontology Mapping System with Strategy Prediction Capabilities." Data & Knowledge Engineering, vol. 69, No. 5, pp. 444-471, 2010.

Pretschner, A., "Ontology Based Personalized Search," Thesis, University of Kansas, 1998.

Sanchez, D. et al., "Knowledge-Based Scheme to Create Privacy-Preserving but Semantically-Related Queries for Web Search Engines," Information Sciences, vol. 218, pp. 17-30, 2013.

Sanchez, D. et al., "Learning Non-Taxonomic Relationships from Web Documents for Domain Ontology Construction," Data & Knowledge Engineering, vol. 64, No. 3, pp. 600-623, 2008.

Syed, Z. et al., "Wikipedia as an Ontology for Describing Documents," Technical Report, Univerity of Maryland, Baltimore County, 2007.

Tao, T. et al., "An Ontology-Based Information Retrieval Model for Vegetables E-Commerce." Journal of Integrative Agriculture, vol. 11, No. 5, pp. 800-807, 2012.

(56) References Cited

OTHER PUBLICATIONS

Thiagarajan, R. et al., "Computing Semantic Similarity Using Ontologies", HP Labs Technical Report, 2008.

Tran, T., et al., "Ontology-based Interpretation of Keywords for Semantic Search," International Semantic Web Conference /Asian Semantic Web Conference, Lecture Notes in Computer Science, Springer, vol. 4825, pp. 523-536, 2007.

Vallet, M. et al., "An Ontology-Based Information Retrieval Model," Procedings of the Second European Semantic Web Conference, 2005.

Widyantoro, D. et al, "A Fuzzy Ontology-Based Abstract Search Engine and Its User Studies," Proceedings of the 10th Institute of Electrical and Electronics Engineers, International Conference on Fuzzy Systems, p. 1291-1294, 2001.

Williams, A. et al., "An Instance-based Approach for Identifying Candidate Ontology Relations within a Multi-Agent System," Fourteenth European Conference on Artificial Intelligence, Ontology Learning ECAI-2000 Workshop, Germany. 2000.

Wu, J. et al., "A Study of Ontology-based Query Expansion," Cheriton School of Computer Science, University of Waterloo, Technical Report, 2011.

* cited by examiner

CLUSTERED INFORMATION PROCESSING AND SEARCHING WITH STRUCTURED-UNSTRUCTURED DATABASE BRIDGE

CROSS-REFERENCE TO RELATED APPLICATIONS

This application claims priority to U.S. Provisional Patent Application No. 61/736,464, filed Dec. 12, 2012, and to U.S. Provisional Patent Application No. 61/621,970, filed Apr. 9, 2012. The contents of both of those applications are incorporated by reference herein in their entireties.

BACKGROUND OF THE INVENTION

1. Field of the Invention

The invention relates to computer-based searching, information retrieval, indexing, and storage.

2. Description of Related Art

Decades ago, large amounts of data were stored in a variety of different formats, depending on the application programs that were intended to access the data, the data types, and the preferences of the programmers who created the programs. In 1970, E. F. Codd, working at the IBM Research Laboratory, wrote a seminal paper, "A Relational Model of Data for Large Shared Data Banks," *Communications of the ACM* 13:6 (June 1970) proposing a new, relational way of storing large amounts of data. (That paper is incorporated by reference in its entirety.) Codd suggested that the formats in which data was stored should be independent of particular application programs and consistent across different types of programs. The relational database was born.

In a relational database, data is stored in so-called "tables," with certain fields in each table acting as searchable index fields and allowing a searcher to "relate" the information in one table with the information in another table. For example, assume that one table, "USERS" identifies users of a shared computing system and contains fields including first name, last name, gender, age, and identification number. Another table in the same database, "USAGE," contains information on users' use of a resource by identification number, including the fields identification number and usage amount. In that case, the "identification number" field links and provides a relationship between the two tables, such that an interested person could, for example, easily query the database for the names of all users whose usage exceeds a desired threshold, in which case the set of results would include selectively concatenated information from both tables.

Over the years, the use of relational databases in all sectors of industry exploded. Structured Query Language (SQL) evolved to allow database users to make very sophisticated queries of relational databases; essentially, the SQL language acts as an interface to most modern relational databases. Oracle, Inc. was one of the first and most prominent purveyors of enterprise-grade relational database systems, although many competitors emerged. As the Internet age dawned in the 1990s, relational databases became ubiquitous and open-source (i.e., user developed, readily shared, and typically low cost) relational database programs, like MySQL, emerged alongside offerings by major corporations, with the SQL language itself becoming more and more standardized. Ultimately, SQL databases have been used to handle the back-end processing for most major websites, and continue to be popular solutions.

The advantages of relational databases in general and SQL databases in particular are well documented in the literature. As Codd described, they are independent of the particular application programs that create and access them. The structure of the databases typically provides for relatively fast searching, and their ubiquity makes them easier to create and maintain and provides a variety of software options in the marketplace. Moreover, with recent relational database software, the tables defined in relational databases can often store not only textual data, but other forms of data, including various image, audio, and video files.

As the Internet has grown to maturity, the amount of data stored in and processed by computer systems has increased to the point where a single dataset may involve terabytes or even petabytes of information. Google, Inc., the Internet search company, has been one of the leaders in the science and mechanics of processing large data sets. Google's fundamental innovation in World Wide Web searching was to decide which pages were most relevant or authoritative by measuring how many other pages "linked" to them. By that algorithm, pages that were linked to more frequently were considered to be more authoritative and were presented earlier in the list of search results under most circumstances.

In 2004, two Google engineers, Jeffrey Dean and Sanjay Ghemawat, published a paper entitled "MapReduce: Simplified Data Processing on Large Clusters" describing a generalized, two-step method for processing a large dataset. That paper is incorporated by reference in its entirety. In a first step, a "map" function parses a dataset to obtain a set of associated data values and a "reduce" function parses that distributed set to output a final value or set of values. As one example given in the paper, the map-reduce method may be used to count uniform resource locator (URL) access frequency associated with an Internet site. In that case, the map function would process a log of web page requests and output <URL, 1> each time the particular URL in question is found in the log. The corresponding "reduce" function would count the output of the "map" function and output the data <URL, total count>. The MapReduce paper provides significant guidance in how to distribute map and reduce operations across a number of networked machines to successfully parse very large datasets.

So-called "NoSQL" or "unstructured" databases have developed in parallel with MapReduce and other large dataset processing techniques. These databases deviate from the traditional relational databases that use SQL for an interface either by using an interface other than SQL (e.g., JavaScript, XML, etc.), or by not storing data in tables and thus deviating entirely from the relational database model. These databases may be particularly suited for handling large datasets and for facilitating particular large-scale MapReduce operations on stored data. However, their feature sets may not be as robust or as standardized as SQL-based relational databases.

While the tools for processing large datasets have improved, and techniques for distributing processing tasks over large numbers of networked computers are now well described and commonly used, current information processing techniques are still not very good at facilitating deeper understanding of the information that is processed, e.g., at automatically making connections not only between related points or pages in a dataset, but between related concepts reflected in the dataset.

SUMMARY OF THE INVENTION

Aspects of the invention relate to systems, methods, and software for clustered searching with a structured and unstructured database bridge. Methods according to aspects of the invention involve searching in response to one or more search query terms. A search is carried out in one or more data repositories, and search results are clustered based on distance measurements calculated for the results. The searching and clustering continue recursively or iteratively either a defined number of times or until predefined limits or characteristics have been met. The results, organized in clusters, typically include both literal results for the query and results for related terms and concepts that are included because they are found to be within a specified distance of the literal or first-pass results.

Once the set of clustered search results is established, the clusters are stored and, in most embodiments, mirrored both in a conventional relational database system and in an unstructured database. This allows retrieval of the result set quickly using either the relational database or the unstructured database. More generally, methods according to aspects of the invention allow information to be organized according to the connections between the underlying pieces of data, and also allow data to be organized according to existing hierarchies inherent in the data. The data repositories searched in methods according to embodiments of the invention may be particular, domain-specific databases that are pre-qualified as authoritative, like the PubMed database of scientific and biomedical publications, or the methods may be executed on more general data repositories, as would be the case of a more generalized World Wide Web search.

A system according to another aspect of the invention includes one or more servers, at least one unstructured database, and at least one relational database. The one or more servers are connected over a communications network, such as an intranet or the Internet, to a plurality of data repositories that are to be searched. At least one relational database for result storage and indexing, and at least one unstructured database for result storage, are either implemented on the one or more servers or in communication with them to store the results of any searching operations. Depending on the embodiment, the one or more servers may be divided into scheduling machines, which are responsible for coordinating the implementation of tasks on other machines, and worker machines, which are responsible for actually executing tasks as directed by the scheduling machines. Of course, systems according to aspects of the invention are intended to be scalable; in the simplest embodiments or implementations, the one or more servers may comprise a single machine that implements all of the tasks of the methods described above. The one or more servers may communicate via the communications network with any number of user machines which formulate search queries, transmit the queries to the one or more servers, and access the clustered sets of results.

Yet another aspect of the invention relates to machine-readable media and to software on that media, i.e., sets of machine-readable instructions on the machine-readable media that, when executed, cause the machines to perform the tasks of the methods described above.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the drawings, and in which.

DETAILED DESCRIPTION

Figure 1:
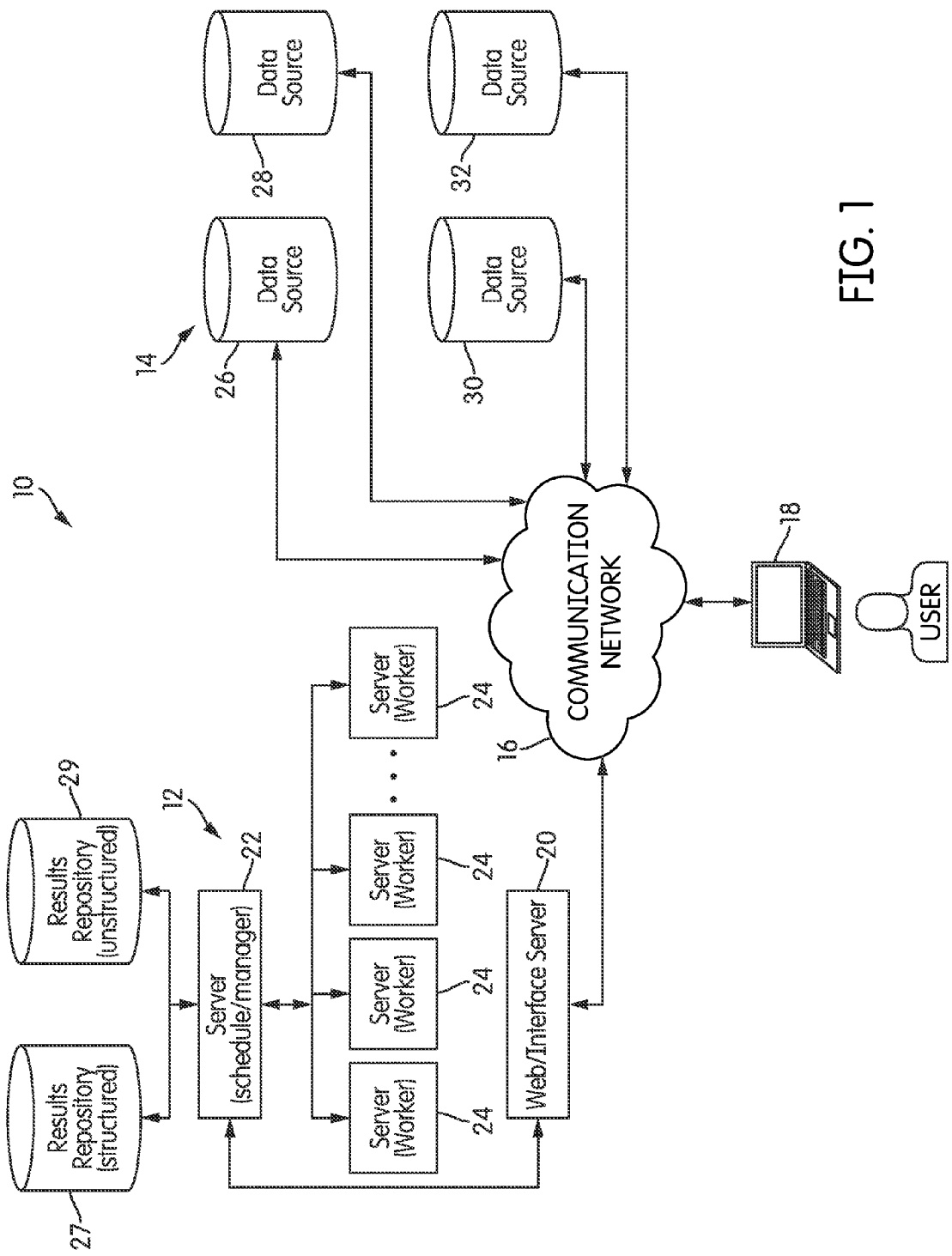
FIG. 1 is a schematic diagram of a system according to one embodiment of the invention.

FIG. 1 is a schematic diagram of a system, generally indicated at 10, according to one embodiment of the invention. Generally speaking, system 10 includes a search system 12 and any number of data sources 14. A communications network 16 provides communication between the search system 12, the data sources 14, and any number of user machines 18. Depending on the embodiment, the communications network 16 may be a local area network (LAN), such as a corporate intranet, or a wide-area network (WAN), such as the Internet. As those of skill in the art will realize, multiple communication networks may connect the components of system 10 in some embodiments.

The search system 12 includes at least one server with sufficient memory and processing capabilities to perform the functions that will be described in greater detail below. That server may have implemented on it, in software, a World Wide Web or interface server, a structured database, an unstructured database, and all other components necessary or desirable for performing the functions of system 10.

However, in the illustration of FIG. 1, the search system 12 is implemented as a distributed system or "cluster" of computers that are connected together (i.e., by conventional Ethernet connections) to co-operatively perform their functions. Specifically, a web/interface server 20 receives search information, including search query terms, from the user machine 18. Depending on the particular implementation, the web/interface server 20 may also provide a search interface to a plurality of users to allow those users to perform searches. The web/interface server 20 may be, for example, a computer running APACHE World Wide Web server software that communicates using hypertext transfer protocol (HTTP) and provides information in the form of hypertext pages, or pages in some other markup language, to the user machine 18. If the communication network 16 is the Internet, this communication would typically take place on top of a traditional transmission control protocol/internet protocol (TCP/IP) communication scheme.

The web/interface server 20 may use any conventional software to accomplish its functions. For reasons that will be explained below in more detail, if the web/interface server 20 does provide Web pages as an interface to the search system 12, those pages may be coded in static or dynamic hypertext markup language (HTML) with cascading style sheets (HTML/CSS), although for reasons that will be explained below in more detail, many of the pages provided by the web/interface server 20 will be dynamically generated using a server-side scripting technology like PHP, active server pages (ASP), Java Servlets, Java Server Pages (JSP) etc. For example, the web/interface server 20 may run the APACHE TOMCAT application server, an open source implementation of the Java Servlet and Java Server Pages technologies.

If the web/interface server 20 does not provide a visual interface per se, it may provide and transmit information in any suitable format, including ASCII text and information description languages like extensible markup language (XML).

Typically, the user machines 18 would have conventional Web browser software installed, and would use that software to communicate with the web/interface server 20 and to view and interact with the interface it provides. Of course, in some embodiments, each user machine 18 may have specific client software installed that provides and instantiates the interface and allows the user to communicate with and use the web/interface server 20. The client software may be compiled or interpreted. Additionally, although the user machine 18 shown is a laptop computer, the user machines 18 may be any type of machine, including desktop computers, smart phones, and tablet computers. In some cases, the client software may be an "app" or a small application program that runs on a tablet computer or smart phone. These details will differ from embodiment to embodiment and application to application.

The web/interface server 20 may pre-parse any input received from a user machine 18 to ensure that, for example, a query is in the correct format, and may be programmed to handle basic input errors. Once the input is correct, the web/interface server 20 communicates the query data to a scheduler/manager server 22.

The scheduler/manager server 22 coordinates the tasks necessary to actually perform a search and manage data in a multi-user environment with many simultaneous and near-simultaneous search requests. The scheduler/manager server 22 parcels out the tasks of actually performing the search or managing data to any number of worker machines 24 and deals with issues such as failure of one or more of the worker machines 24 during execution of the search tasks. In essence, given an available amount of processing power, the scheduler/manager server 22 is given the task of recruiting as many worker machines 24 as are best in any given situation to perform a search, clustering operation, or any other assigned task in the minimum amount of time necessary. The scheduler/manager server 22 would typically be provided with scheduling and task management software to enable scheduling of large scale distributed task management. In general, the search system 12 may implement a file system and software designed for large-scale, data-intensive distributed processing, such as the Apache HADOOP software framework (Apache Software Foundation).

The worker machines 24 themselves may be either conventional computer server machines similar in configuration to the scheduler/manager server 22, for example, rack-mount server systems. They may also be lower-powered commodity personal computers, an approach favored by some companies, including Google, Inc.

Of course, although one scheduler/manager server 22 is shown in FIG. 1, and it is directing only a few worker machines 24, any number of scheduler/manager servers 22 and any number of worker machines 24 may be a part of system 10, and other systems according to embodiments of the invention. One of the advantages of system 10, and particularly of the search system 12, is scalability. In fact, the search system 12 could be implemented on or as a part of a shared computing facility, i.e., a data center. As one example, system 12 could be implemented using Amazon Web Services (Amazon Web Services, Inc.), which provides easily resizable and scalable computing capabilities. However, as was noted briefly above, in the simplest embodiments, the search system 12 could be implemented on a single machine.

Also shown in FIG. 1 are a number of data sources 26, 28, 30, 32. The data sources 26, 28, 30, 32 may be controlled by the same entity that controls the search system 12, or they may be controlled by other entities. The data sources 26, 28, 30, 32 represent any sources of data that may be searched or otherwise used in the use of system 10. In a search of the general World Wide Web, the data sources 26, 28, 30, 32 may represent either individual Web servers, or aggregators and search engines, like the Google search engine (Google, Inc.), the Bing search engine (Microsoft, Inc.), and the Yahoo! search engine.

While system 10 may certainly be used to search the World Wide Web and to organize the information that is developed by that kind of searching, the data sources 26, 28, 30, 32 may also be specific to particular domains and subject matter. For example, system 10 may be configured to search the PubMed database, a database maintained by the U.S. National Institutes of Health (NIH) containing copies of papers on many medical, biomedical, and general science topics across a number of different publications. Other medical and biomedical databases may include the BLAST® (Basic Local Alignment Search Tool) database containing genetic and amino acid sequences, also maintained by the U.S. National Institutes of Health (NIH); the Protein Data Bank (PDB) containing protein structure and conformation information, which is maintained by a consortium of universities; and medical and disease databases, including information from the U.S. Centers for Disease Control and Prevention.

The exact nature of the databases or the information stored in them is not critical to the invention, and although specific application programming interfaces (APIs) may need to be constructed to interface and facilitate communication with specific databases, the data sources 26, 28, 30, 32 may contain virtually anything. Other examples may include data sources containing internal corporate records; government records, including criminal records, land records, corporate records, and automobile registration records; and World Wide Web data sources. The data sources 26, 28, 30, 32 may be managed by or contain the records of a single organization, or they may hold the records of many organizations.

When a search is not a search of the general World Wide Web, it may be helpful if the data sources 26, 28, 30, 32 included in the search are known to be authoritative. For example, the NIH databases mentioned above are databases that are known to be authoritative. Of course, that need not be the case in all embodiments, and in some cases, it may be necessary or desirable to assume that a particular data source 26, 28, 30, 32 is authoritative based on its source; associations; authors; number of other sites, databases, or papers that refer to it; or some other metric(s) of authority. Some embodiments of system 10 may cull information from both the general World Wide Web and certain other data sources 26, 28, 30, 32, in which case, the search results may be weighted or clustered appropriately to indicate the level of confidence in the authoritativeness of the results.

Overall, system 10 as illustrated in FIG. 1 may be referred to colloquially as a "cloud-to-cloud" type of system, in that both the search system 12 and the data sources 26, 28, 30, 32 it searches may actually be in large-scale "cloud" data centers, rather than on the same physical premises, and very little to none of the processing may be done on the individual user machines 18 depending on the embodiment.

Moreover, while some of the description above presupposes a search-type environment and search/information retrieval operations, that need not be the case in all embodiments. In some embodiments, one or more of the data sources 26, 28, 30, 32 may "feed" data directly into the search system 12. The search system 12 may take input from a single source or multiple sources, either continuously or discontinuously (i.e., in batches).

As one example, one or more of the data sources 26, 28, 30, 32 may be information-generating systems or appliances, such as cameras, document scanners, medical imaging systems, computer peripherals, or other devices that automatically submit their data to the search system 12 for indexing, as will be described below in more detail. As another example, syndication protocols and technologies, such as really simple syndication (RSS), may be used to feed information from the data sources 26, 28, 30, 32 into the search system 12.

Figure 2:
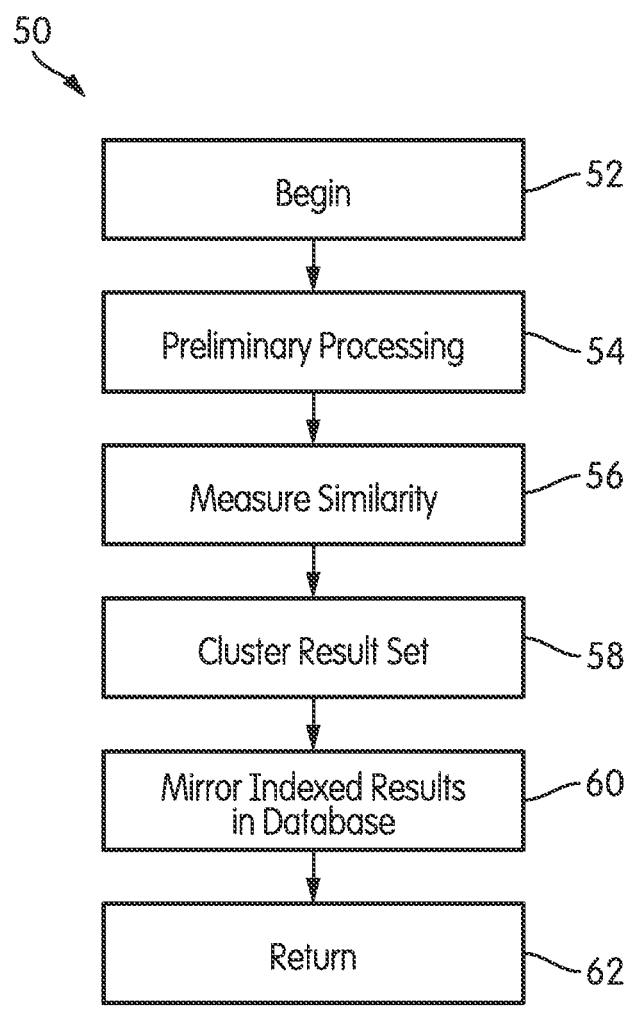
FIG. 2 is a high-level flow diagram of a method for searching and indexing information according to another embodiment of the invention.

FIG. 2 illustrates a method, generally indicated at 50, for searching and indexing data using a system like system 10 of FIG. 1. Depending on the embodiment and the particular circumstances, method 50 may be used to pre-process and index data from feeds, or it may be used to search and index one or more data sources 26, 28, 30, 32. For that reason, method 50 as illustrated in FIG. 2 contains only a "core" set of tasks; particular applications of method 50 to active search and to automatic data processing will be described below in more detail. Method 50 begins at task 52 and continues with task 54.

At the beginning of method 50, in task 52, it is assumed that a set of search results or one or more "feeds" of information are available for processing. These search results may be obtained by searching the data sources 26, 28, 30, 32, or by examining the incoming feeds from the data sources 26, 28, 30, 32. As was set forth above, some of the data sources 26, 28, 30, 32 may be external and require APIs, specific search URLs, or other middleware to execute a search. For any internal data sources 26, 28, 30, 32, an existing search engine, such as ADOBE SOLR may be implemented.

Method 50 also assumes that some data may be able to be immediately processed by search system 12, while other data may require preliminary or predicate processing steps before the rest of method 50 can be performed. In task 52, any necessary preliminary processing steps are performed. Thus, task 52 can be considered to be an optional task, depending on the situation and the nature of the data that is being processed.

For example, ASCII text and other textual and numerical data may be immediately processed by method 50. However, image and video data, to give two examples, may require other preliminary processing first. For example, documents in image or Portable Document Format (PDF) formats may require optical character recognition (OCR) to generate recognized text that can be processed by method 50 and search system 12. Images may be subjected to optical character recognition, if they are believed to contain textual data, or other image processing techniques, like edge, feature, or facial detection. Generally speaking, task 54 may encompass any preliminary processing tasks necessary to make the data to be searched or indexed usable for other tasks of method 50.

Of course, task 54 may involve any number of sub-tasks, and those sub-tasks may depend on the type of data that is being processed. In some embodiments, a set of functions may determine the incoming data type of each piece of data that is processed and, once that determination is made, send the data for preliminary processing appropriate for that data type. Thus, in this example, images of documents might be subjected to OCR, while documents that contain machine-readable text would not be. For example, in some embodiments a software toolkit such as the APACHE TIKA toolkit (The Apache Software Foundation) may be used to identify common file types and to extract data and metadata from documents. Other toolkits, like the Behemoth toolkit, may be used to extract binary data and metadata from binary data files.

Once the preliminary processing tasks are complete, method 50 continues with task 56.

In task 56, method 50 measures similarities or distances between documents or elements of data. The basis for a similarity or distance measurement may be any quantifiable attribute of the data. For example, to compare documents or abstracts, word counts may be used.

Various methods may be used to establish similarity between points of data. For example, for textual data or documents, one useful measure of similarity is cosine similarity. Word counts of words related to a particular concept or set of search terms are assembled into attribute vectors, e.g., A and B, and the similarity between the underlying documents is established using cosine similarity, as in Equation (1) below:

$$Sim = \cos\theta = \frac{A \cdot B}{\|A\|\|B\|} \qquad (1)$$

In other words, the dot product of the two vectors is normalized by the magnitude of the two vectors to determine the similarity. Thus, the resulting similarity measure is a real number between 0 and 1.

Cosine similarity is one useful similarity measure when evaluating and comparing one unknown corpus of text or other information with another. However, different measures of similarity and distance may be used for other types of data and in other embodiments.

As was noted above with respect to system 10, the data sources 26, 28, 30, 32 may contain dissimilar types of data, all of which may be relevant to a particular search query or indexing operation. One advantage of system 10 and method 50 is that they are able to access data sources 26, 28, 30, 32 housing dissimilar types of data. Another advantage is that they can establish relationships between data, and leverage existing known relationships.

More particularly, the similarity measures used in any situation will depend on the type of data. Additionally, system 10 and method 50 may make use of metadata, properties, and data ontologies or known data relationships in determining similarity and data inclusion. Moreover, combined or hybrid similarity or distance measures may be used.

It is advantageous in method 50 to use data sets that are known to be authoritative, and more advantageous yet to use or access data sets with known and established properties, links to other data, descriptors, and metadata. For example, there are a number of linked open datasets available on the Internet—datasets that use Resource Description Framework (RDF), extensible markup language (XML), and other data- and property-descriptive technologies to link related data together and to describe it in useful ways. Examples of linked open datasets include the human disease network or Diseasome (Goh, K-I, et al., *Proc. Natl. Acad. Sci.* 104:8685-8690 (2007), the contents of which are incorporated by reference in their entirety); DrugBank, a database that combines detailed drug data with comprehensive drug target (sequence, structure, and pathway) information; DBpedia, a dataset with data extracted from the Wikipedia online encyclopedia; and GeoNames, which provides descriptions of worldwide geographical features, to name but a few of the available linked open datasets.

As one example, assume that information about a disease—cancer—is desired. As a first step, the top N abstracts would be fetched from the PubMed database and cosine similarity measures computed from each. Additionally, the Diseasome and DrugBank linked open datasets would be searched. In each case, the number of abstracts retrieved from each database may be controllable by setting it to a defined number, a percentage of the total number of results retrieved, or some defined limit. In some cases, a large number of results may be gathered in an initial pass, with less relevant results being culled in later tasks of method 50.

The Diseasome and DrugBank datasets might, in that case, provide a list of properties such as:

possibleDiseaseTarget=[Craniosynostosis, nonspecific, Cancer susceptibility, Ehlers-Danlos syndrome, type I, 130000, Cancer progression/metastasis, Achondroplasia, 100800, Caffey disease, Craniofacial-skeletal-dermatologic dysplasia, Craniofacial-skeletal-dermatologic dysplasia, Ehlers-Danios syndrome, Kallmann syndrome 2, 147950, Jackson-Weiss syndrome, 123150, Bethlem myopathy, 158810, Beare-Stevenson cutis gyrata syndrome, Hypochondroplasia, 146000, Aneurysm, familial arterial, Dyssegmental dysplasia, Silverman-Handmaker type, Colon cancer, Osteogenesis imperfecta, type I, 166200, Apert syndrome, 101200, Saethre-Chotzen syndrome, Hypochondroplasia, Osteoporosis, 166710, Osteogenesis imperfecta, type IV, 166220, Muenke syndrome, Gastric cancer, somatic, 137215, Bladder cancer, 109800, Cervical carcinoma]

The linked open datasets may also return a number of associated gene sequences, for example:

```
Sequence1: ATGGT
Sequence2: ATGGT
Sequence3: GGGGT
``` as well as a number of associated proteins with amino acid sequences, for example:

```
Sequence1: CNGEKT
Sequence2: TNGEKT
```

Once those searches were performed, a hybrid distance/similarity computation would be performed, depending on the type of data. For text content, the distance/similarity measure is taken as the cosine similarity between the text vectors. For properties fields, the distance/similarity is computed as the cosine similarity of matching properties. For properties that do not match, a distance value of 1.0 is added. The distance value is normalized at the end of the computation. For example, if one document has properties:

(1) possibleDiseaseTarget=[Craniosynostosis, nonspecific, Cancer susceptibility];

(2) drugCategory=http://www.someserver.edu/drugbank/drugcategory/boneDensityConservationAgents;

and a second document has a property:

(1) possibleDiseaseTarget=[Craniosynostosis]

The distance between the "possibleDiseaseTarget" property lists of the two documents might be computed as 0.6 using cosine similarity. Since the other property, "drugCategory" is only found in one document, it will contribute to unit distance. The total distance summed over matching and not matching properties is normalized by dividing by the total number of properties, in this case, 3 (two properties for document 1 and one for document 2).

For the associated gene and protein sequences, a sequence alignment distance is calculated between all pairs, before distances are summed and finally normalized by the number of sequence pairs. Specifically:

```
sequence1: AAAGC
sequence2: GGGGG
sequence alignment distance: 0.8
sequence1: CCCGT
sequence2: GGGGG
sequence alignment distance: 0.8
sequence1: GGGGG
sequence2: GGGGG
sequence alignment distance: 0.0
Total Summed Distance: 1.6
Total Number of Sequence Pairs: 3
Normalized Sequence Distance = 1.6/3 =
0.5333333333333333
```

Those of skill in the art will readily devise other means of calculating similarity and/or distance measurements for other types of data. Once a number of distance/similarity measures are computed for different elements of data, the individual distance/similarity measures are combined linearly, to create a hybrid distance measure, as in:

Hybrid Distance=wt1*TextDistance+
wt2*PropertyDistance+
wt3*GeneSequenceDistance+wt4* Protein
Sequence Distance;

where wt1, wt2, wt3, and wt4 are tunable parameters defined by the user or by a predefined configuration settings file for a particular application. Ultimately, these parameters define the weights assigned to the components in the hybrid distance measurement. Changing them ultimately affects the amount of "noise" or unrelated information that is included in a clustered result set.

After hybrid distance measures are computed, method 50 continues with task 58, in which the results are clustered. Any clustering algorithm may be used in method 50, including hierarchical clustering, k-means clustering and its related algorithms, and ontology-supported hierarchical clustering. In some cases, two or more clustering methods may be used on the same set of data and the resulting sets of clusters may be separately stored. For example, data may be subjected to both hierarchical clustering and to k-means or k-medoids clustering methods. In general, where a clustering method requires a distance measurement, the distance measurement used is the one calculated in task 56 of method 50.

The k-means clustering algorithm, and in particular, the k-medoids algorithm, are particularly suitable for use in method 50. Both of these algorithms break the dataset up into groups and attempt to minimize the distance between points designated as being in a cluster and the center of that cluster. However, the k-medoids algorithm chooses data points as cluster centers, whereas the k-means algorithm does not.

Figure 3:
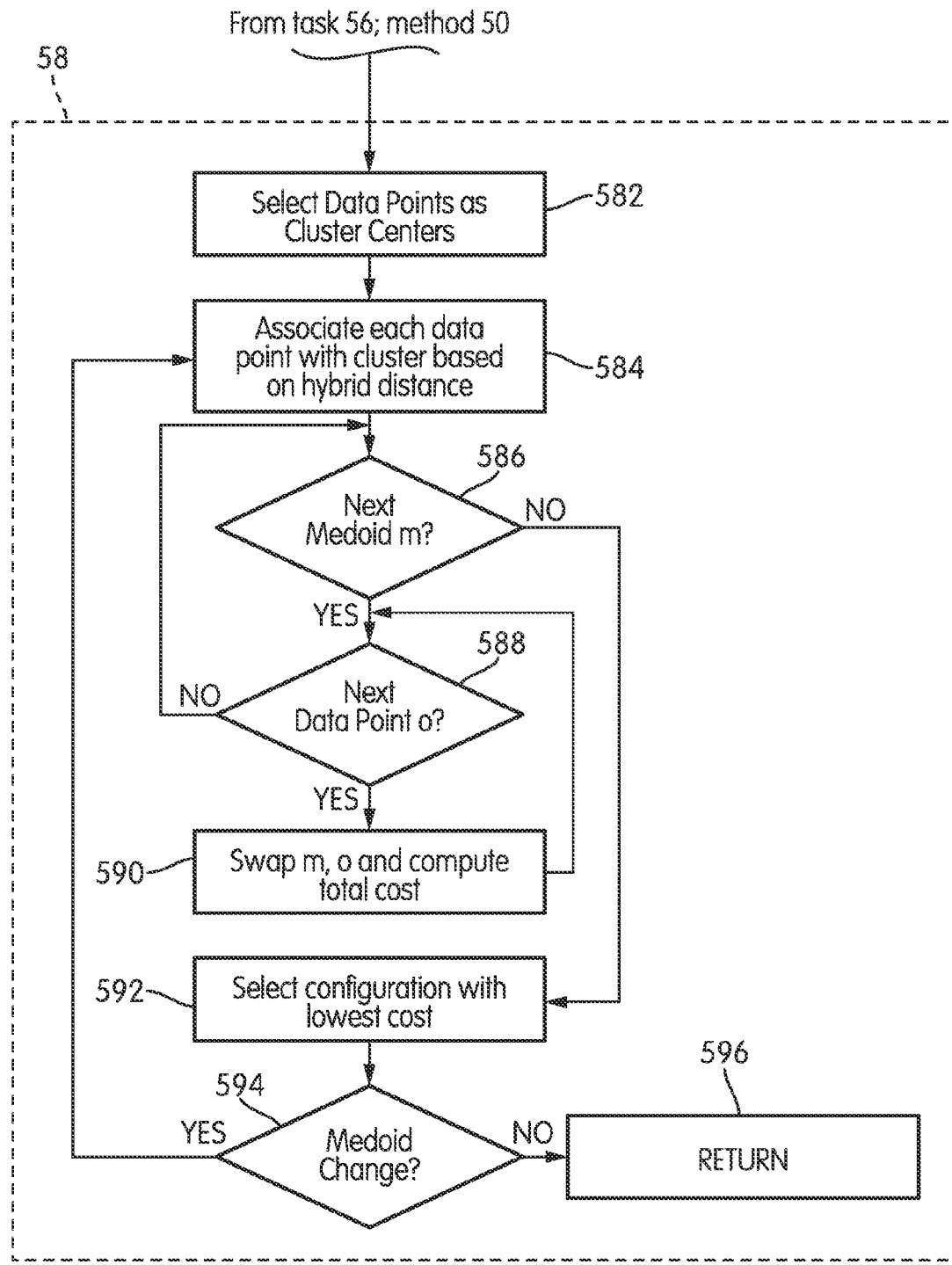
FIG. 3 is a flow diagram of the tasks involved in clustering results in the method of FIG. 2.

FIG. 3 is a flow diagram of the sub-tasks involved in performing task 58 of method 50. Specifically, FIG. 3 illustrates a method for performing k-medoids clustering in task 58 of method 50. Task 58 begins with sub-task 582, in which a number of the data points are randomly selected as the medoids (i.e., the centers of the clusters).

Task 58 then continues with sub-task 584, in which each data point is associated with a cluster (i.e., one of the selected medoids) based on a distance measure. In a traditional k-medoids algorithm, the distance measure used is a Euclidean distance, Manhattan distance, or Minkowski distance, to give a few examples. However, in embodiments of the present invention, the distance measure used is preferably the hybrid distance measure established as a result of task 56. The use of such a hybrid distance measurement allows multiple, dissimilar types of data drawn from multiple sources to be clustered together. Once each data point has been assigned to a cluster based on the hybrid distance measure, task 58 continues with sub-task 586.

Sub-tasks 586, 588, and 590 execute an iterative and/or recursive loop. For each medoid m and each data point in the medoid o, m and o are swapped and the system computes the total cost. In other words, once a data point is chosen as a medoid and the center of a cluster, the system tries swapping other data points for the originally chosen medoid to see if the cost, or distance, is lower. This is essentially a calculation to determine whether any other point in the cluster would make a "better" medoid for the cluster. Cost, in this context, is calculated as it traditionally is in the k-medoids algorithm, specifically using Equation (2) below:

$$\mathrm{cost}(o, m) = \sum_{i=1}^{d} |o - m| \qquad (2)$$

In Equation (2) above, m is the medoid, o is the data point, and d is the number of dimensions.

After this is done for each data point in a cluster (sub-task 588: NO), the next cluster and medoid are selected (sub-task 586: YES). Once these calculations have been performed for every data point in each cluster and there are no more medoids to be processed (sub-task 586: NO), task 58 continues with sub-task 592 and the configuration with the lowest cost is selected. If any of the cluster medoids have changed as a result of the preceding sub-tasks (sub-task 594: YES), control of task 58 returns to sub-task 584 and continues from that sub-task. If the medoids have not changed (sub-task 594: NO), task 58 completes and returns at sub-task 596.

In some cases, an additional culling task may be present in task 56. In that case, a tunable threshold may be used. Specifically, if the hybrid distance between any particular result and the medoid or center of the cluster is greater than a defined threshold, that result may be declared less relevant and culled or removed from the cluster.

Once task 58 is complete, method 50 continues with task 60, and the clustered results are stored and mirrored in both the structured results repository 27 and the unstructured results repository 29. The database schema and the manner in which the clusters are stored will vary from embodiment to embodiment, as well as with the type of data that is being stored. For example, results such as those used in the example above may be indexed based on their existing metadata and properties. If the information being processed in method 50 is the result of a feed from a device, the information may be indexed in the database by the time the data was acquired, the patient or person to whom it relates, or any other available metadata.

Figure 4:
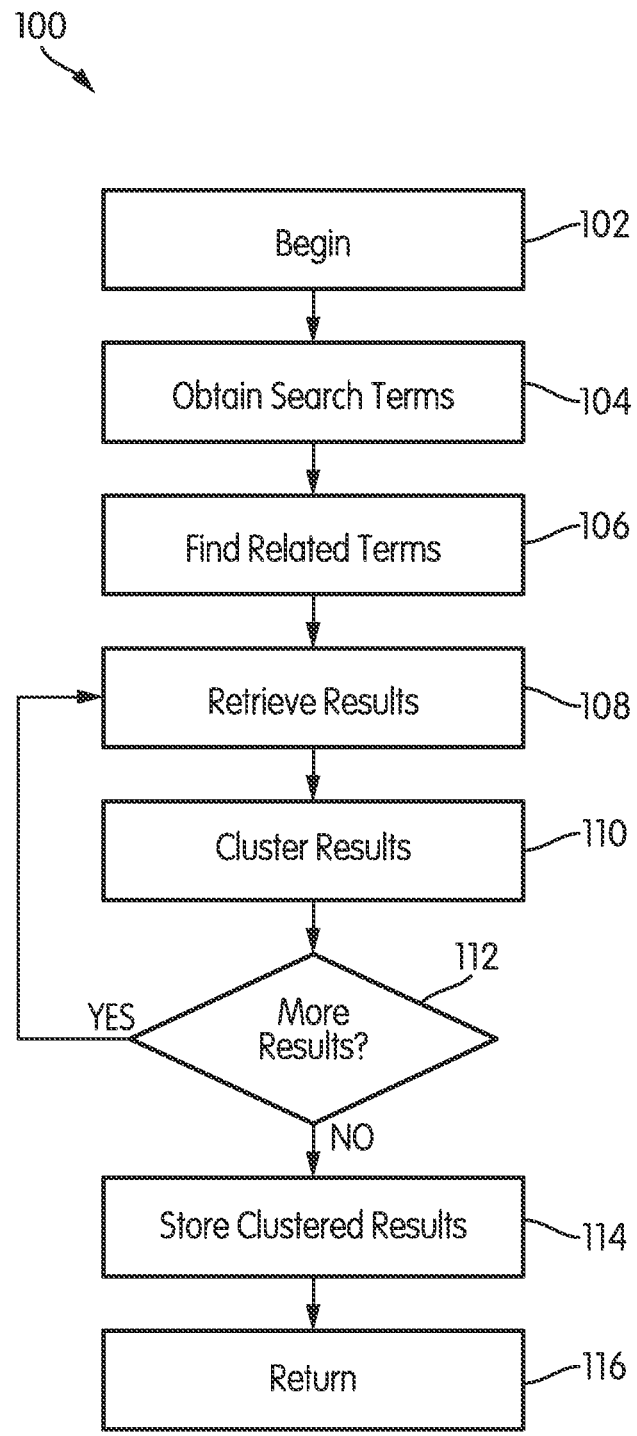
FIG. 4 is a high-level flow diagram of another method according to an embodiment of the invention.

After task 60, method 50 completes and returns at task 62. However, it should be understood that method 50 may be executed many times in serial or parallel. FIG. 4 illustrates a method 100 for implementing an Internet-based search according to another embodiment of the invention. Method 100 begins at task 102 and continues with task 104.

In task 104, one or more search terms are obtained. Search terms may be obtained by actively querying a user for them, or by accepting search terms provided to a search engine. Once search terms are accepted, method 100 continues with task 106.

As was described above, one advantage of methods 50, 100 according to embodiments of the invention is that they "sweep in" related information from various sources 26, 28, 30, 32 and can find and define related information. In task 106, the search system 12 uses available resources to find search terms that are related to the original search terms and should thus be searched. Task 106 may involve searching for the original search terms in a resource that identifies related terms and concepts. In effect, the purpose of task 106 is to identify ontologies, underlying relationships between concepts.

The resource used to find related search terms may be a lexical dictionary, such as the WordNet® lexical dictionary maintained at Princeton University. As is known in the art, lexical dictionaries catalog relationships between words, including synonymy (words having the same meaning), hyponymy (words with super-subordinate relationship), and meronymy (words that have a part-whole relationship with other words). If there is no appropriate resource that explicitly defines relationships between search terms and other related terms, the information may be extracted from the search results themselves later tasks of method 100, as will be described below in more detail.

Other suitable resources for finding related search terms may include the U.S. Library of Congress Subject Headings (LCSH) and the Medical Subject Headings (MeSH) promulgated by the U.S. National Library of Medicine and used in the MEDLINE/Pubmed databases. These resources use controlled vocabularies—predefined, authorized sets of terms to define concepts. However, it should be understood that although controlled vocabularies may be used, the clustering tasks of methods 50, 100 according to embodiments of the invention mean that these methods can establish relationships, hierarchies, and ontologies with any sort of vocabulary, including full, unrestricted natural language vocabularies.

Task 106 may happen prior to or at the same time as task 108, which follows it in FIG. 4. In other words, as soon as search terms are identified, the search system 12 may proceed to begin searching for related resources while at the same time, in parallel, retrieving actual results, as shown in task 108. While those other resources may be well-defined in particular cases, as in the biomedical example identified above, in general search contexts, the nature of other data sources 26, 28, 30, 32 with potentially relevant search results may not be readily apparent.

Once the results are retrieved, they are clustered as described above using a hybrid distance measure for disparate types of data with a clustering algorithm such as k-means or k-medoids, as shown in task 110. After the results have been clustered in task 110, method 100 continues with task 112, a decision task. If there are more results (task 112: YES), control of method 100 returns to task 108; if there are no more results (task 112: NO), the clustered results are stored in task 114 before method 100 returns at task 116.

As a specific example of how task 114 may be accomplished, the actual result set of documents may be downloaded to the storage system of a user's local machine 18 and arranged by cluster in a set of nested hierarchical directories or folders using the file system of the local machine 18. The documents and information, arranged in the nested hierarchies, can then be stored.

In terms of the MapReduce set of operations described above, tasks 106 and 108 may be considered to be "map" functionality, in that they define the scope of data that is to be operated on, and tasks 110, 112, and 114 may be considered to be the "reduce" functionality, as they operate on an intermediate result set to create a final result.

The presence of task 112, the decision task, allows method 100 more flexibility, in that an initial set of results may be retrieved, and additional results may be retrieved by including references cited in a document in the initial result set, or by traversing links in the initial result set. Of course, cited references and hypertext links are overt indicators of a relationship between the document or resource in question and other documents or concepts. Other measures may be used. For example, the system may create a word count for each document, with each word that appears more than a threshold number of times indicating a concept that should be searched and potentially included in the clustered results. User-defined parameters may be used to define how deep the search system 12 goes in traversing links, including references, and identifying other concepts that should be searched and potentially included in the clustered results while implementing tasks 108-112. Of course, task 110 may occur in parallel with the search and retrieval operations of task 108.

Although task 114 is shown in FIG. 4, and it may be advantageous in many or most cases to store copies of clustered result sets, or links to the original documents of a clustered result set, locally, this is not required in all embodiments. Instead of storing the clustered results, the results could simply be output to the user. Method 100 concludes and returns at task 116.

In his paper setting out the fundamental principles of relational databases, E. F. Codd identified three main deficiencies in the then-existing information retrieval systems: ordering dependence, indexing dependence, and access path dependence. Codd's thesis was that data had to be ordered in a specific way in the application program, indexed in a specific way, and accessed in a specific way, and if any of those elements changed, the application program might fail. By contrast, systems and methods according to embodiments of the invention provide ordering, indexing, and access path unity. In other words, the ability to store clustered results both in a relational database and more natively in an unstructured database mitigate the disadvantages of which Codd was writing while providing access to all of the advantages of relational databases and all of the advantages of unstructured databases. Thus, mirroring the stored data in both the structured database 26 and the unstructured database 28 allows the data to be accessed in whichever way is most efficient for a given type of search or other data operation. The combination of pre-clustered related data and both structured and unstructured ways of accessing and further processing that data have the potential to make it vastly easier to use the data in future searches.

Method 50 and method 100 are essentially methods of "ingesting" data from other sources—feeds, peripherals, or other resources—turning the structured and unstructured results repositories 27, 29 into search resources themselves. For direct searches of the clustered results, the unstructured data repository 29 may provide faster results; for applications that require or benefit from relational databases, the structured repository 27 is available. In fact, the structured results repository 27 may also be used to establish and maintain compatibility with those applications that are written to use relational databases, and may be used with third-party application programming interfaces (APIs) to access the data that is clustered and stored as a result of methods 50 and 100 according to embodiments of the invention.

Figure 5:
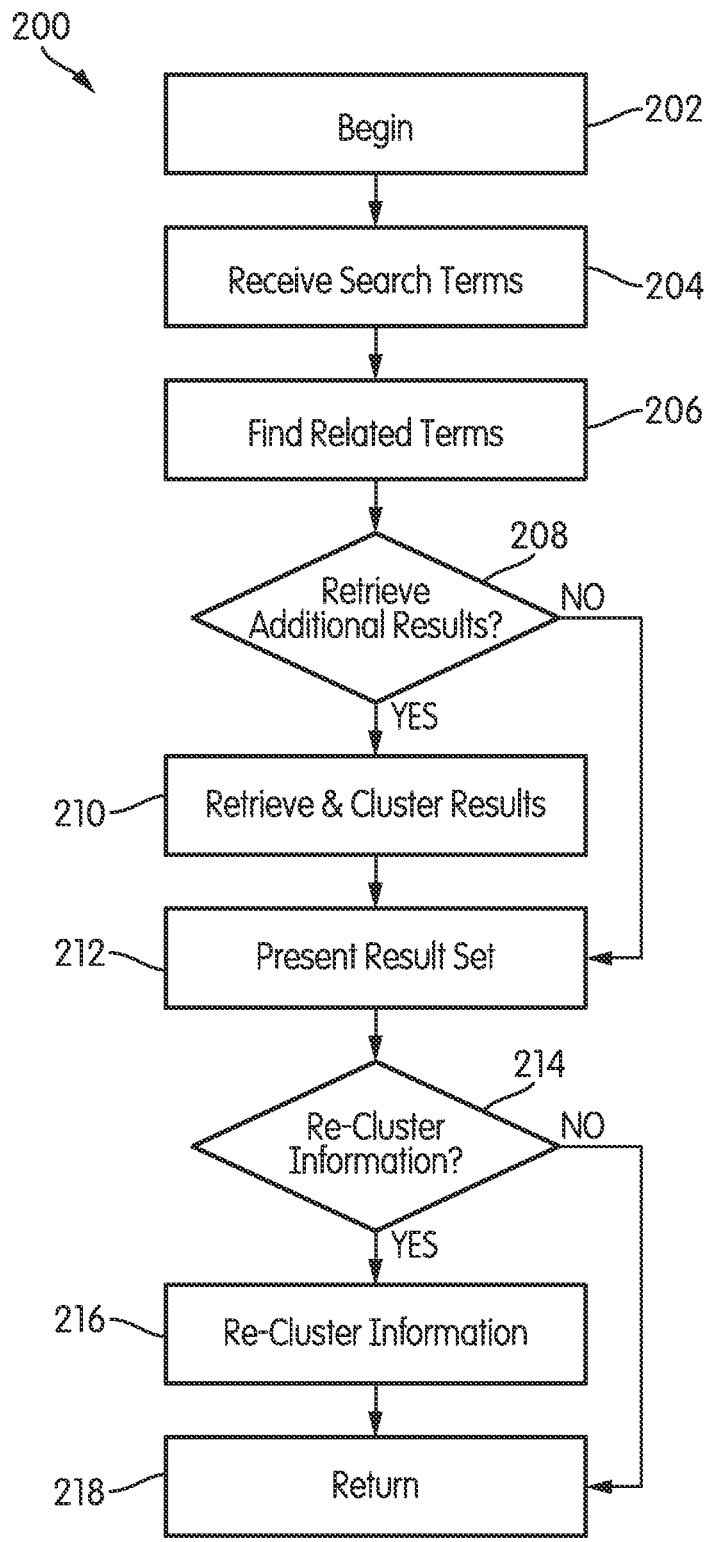
FIG. 5 is a flow diagram of a method for using the system of FIG. 1 to search information that has been indexed and stored.

FIG. 5 is a flow diagram illustrating a method 200 for searching for specific data once it has been stored in the structured results repository 27 and the unstructured results repository 29. Method 200 begins at 202 and continues with task 204, in which search terms or parameters are received. The search terms may be received in task 204 as part of a direct search from a user, e.g., coming from a computing device 18 through a web/interface server 20, as in system 10 of FIG. 1.

The search terms may also be received in task 204 in the broader context of an application program in which it is necessary to retrieve information in order to perform the application's functions. For example, system 10 and methods according to embodiments of the invention may be used for data storage in an electronic health records (EHR) system, in which case the search terms in question may relate to retrieving a patient record or records so that those records can be annotated and/or reviewed; a motor vehicle license record system; an e-commerce product catalog; a biomedical and disease research application; and many other types of applications that require or benefit from robust data storage and retrieval.

Once the search terms have been received in task 204, method 200 continues with task 206, and the clustered results that have already been stored in the structured data repository 27 and the unstructured data repository 29 are searched for the term in question. Of course, an advantage of systems and methods according to embodiments of the invention is that because these systems and methods establish and preserve natural hierarchies and ontologies, task 206 can return not only direct results for the search terms in question, but also related concepts. Method 200 continues with task 208.

In some cases, a search of the clustered results in task 206 may be all that is necessary to return a complete result set. That, for example, may be the case in an EHR application where all of the records in question are present in the structured and unstructured data repositories 27, 29, and in applications where all of the relevant data is provided to system 10 by way of feeds or other means. It may also not be necessary where the clustered search results that are stored in the data repositories 27, 29 are regularly or continuously updated by re-searching relevant search terms. However, in more general applications, e.g., where the World Wide Web is involved, or where broader searching of technical literature is desired, it may be advantageous to search for and retrieve additional results at the time that an individual search is performed. This may occur, for example, if the number of results available for a particular set of search terms falls below a desired number, or the relevance (as measured by a similarity or distance measurement) of the available results falls below a threshold. Additionally or alternatively, the system may ask the user, or be informed by way of a parameter passed to the system in task 204, that additional results should be received. Task 208 of method 200 is a decision task. If additional results are to be retrieved (task 208: YES), method 200 continues with task 210; if not (task 208: NO), method 200 continues with task 212.

In task 210, additional results for the search terms are retrieved and clustered. This may be done in the same way as in method 50 or method 100. Following task 210, or following a decision that no additional results are to be retrieved, Method 200 continues with task 212 and the result set is presented to the user.

Either before or after the result set is presented to the user in task 212, method 200 determines whether the stored results should be re-clustered or added to. For example, if additional search results are retrieved, those additional results may need to be added to the existing clusters, or the clusters may need to be entirely re-established. In some cases, the search terms received in task 204 may need to be added to the stored results in the appropriate hierarchical relationship with the existing stored information. Thus, task 214 of method 200 is a decision task. If the information needs to be re-clustered (task 214: YES), method 200 continues with task 216 and the information is re-clustered before method 200 terminates and returns at 218; if the information does not need to be re-clustered (task 214: NO), method 200 continues with and returns at task 218.

Figure 6:
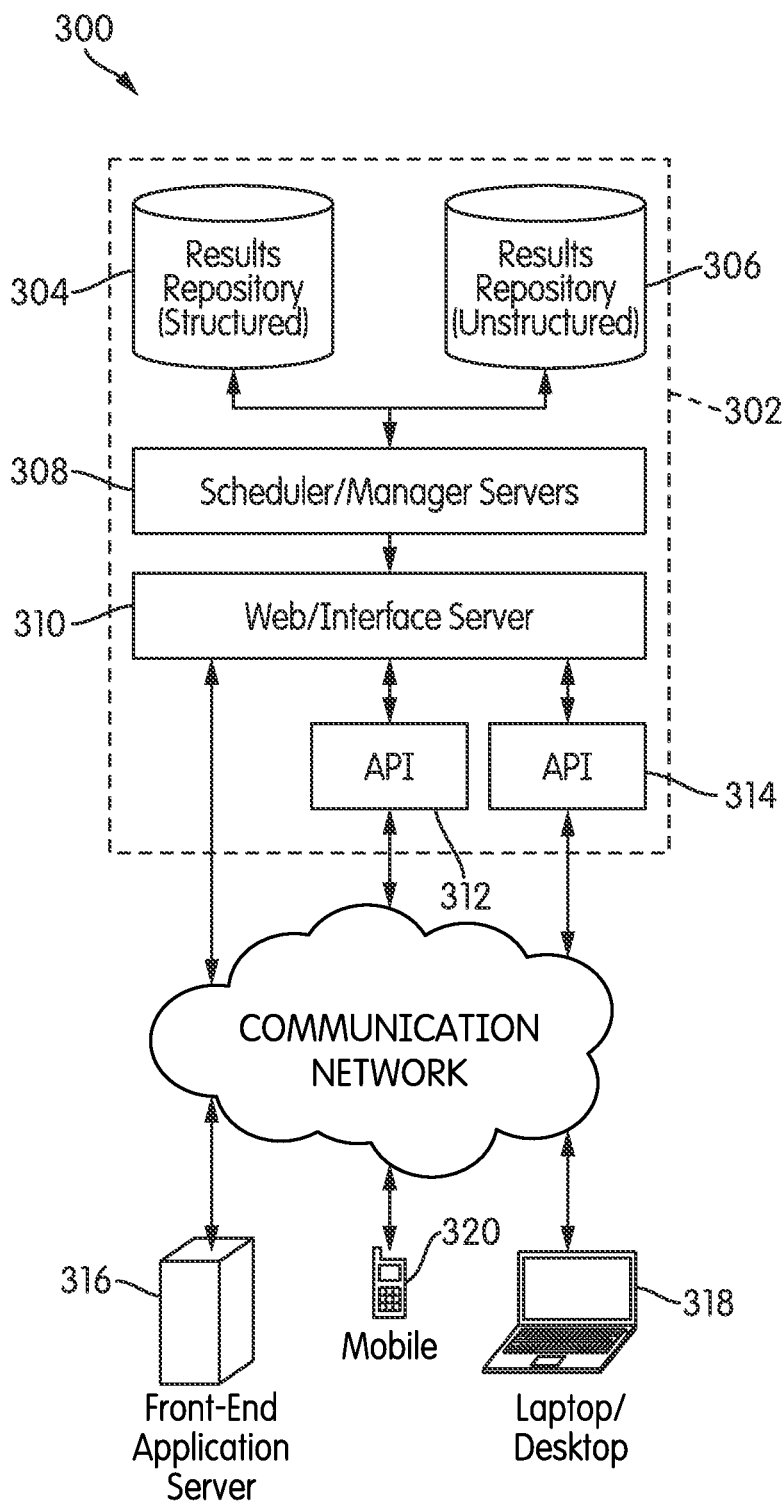
FIG. 6 is a schematic diagram of a system according to another embodiment of the invention for retrieving information.

FIG. 6 is an illustration of a system 300 that employs the methods described above in the context of a broader application. As was described briefly above, the application may be an EHR, a motor vehicle information system, a corporate knowledge management system, or a search system, to name a few. System 300 includes a back-end search and information system 302 that includes many of the components of system 10, including structured and unstructured results repositories 304, 306, scheduler/manager servers 308, and a web/interface server 310. These components operate essentially as described above with respect to system 10. As was also described briefly above, APIs 312, 314 provide an interface to the back-end system 302 for particular applications or particular types of searches.

In the context of system 300, the scheduler/manager servers 308 and/or the web/interface server 310 may automatically direct incoming search and information requests to either the structured results repository 304 or the unstructured results repository 306 depending on which results repository 304, 306 is most appropriate to fulfill the requests. For example, if the request comes through an API 312, 314 for an application that typically relies on SQL and relational databases, the request may be routed to the structured results repository 304. As another example, if the system 300 determines that a search of the unstructured results repository 306 would be faster than a search of the structured results repository 304 in a given context, the search may be performed on the unstructured results repository 306.

On the front end, system 300 may include one or more application servers 316 that provide the applications or functions that use the back-end system 302. Any number of laptops or desktops 318 and mobile devices 320 may also communicate with the back-end system 302 by way of applications. Those applications may be local applications that are compiled or interpreted, or web-based applications provided by the web/interface server 310 and/or the front-end application server 316.

The components of system 300 may serve many different roles. For example, in a medical environment, the front-end application server 316 may be a computer or computers attached to a medical device or diagnostic tool, such as an MRI or ultrasound machine, and may send scans and other information into the results repositories 304, 306 as described above.

While the invention has been described with respect to certain embodiments, the embodiments are intended to be exemplary, rather than limiting. Modifications and changes may be made within the scope of the invention, which is defined by the appended claims.

What is claimed is:

1. A method for indexing and classifying related information, comprising:

using a computing system, measuring the similarity of or distance between a plurality of individual resources using a hybrid distance measurement, at least some of the plurality of individual resources being of different types and originating from different data sources;

clustering the plurality of individual resources into a plurality of clusters using the hybrid distance measurement; and storing the plurality of clusters in both a structured and an unstructured data repository on the computing system or another computing system, such that the structured and the unstructured data repositories contain essentially the same information.

2. The method of claim 1, wherein said clustering comprises k-means or k-medoids clustering.

3. The method of claim 1, wherein said clustering comprises hierarchical clustering.

4. The method of claim 1, wherein the structured data repository comprises a relational database.

5. The method of claim 1, further comprising:

receiving a set of search terms at a search server via a communication network; and searching a defined set of locations for the set of search terms to locate the plurality of individual resources.

6. The method of claim 1, wherein the hybrid distance measurement comprises a linearly weighted composite distance measurement based, at least in part, on cosine similarity.

7. A method for indexing, searching, and retrieving information, comprising:

using a first computing system, measuring the similarity of or distance between a plurality of individual resources using a hybrid distance measurement;

clustering the plurality of individual resources into a plurality of clusters using the hybrid distance measurement;

storing the plurality of clusters in both a structured and an unstructured data repository on the computing system or another computing system, such that the structured and the unstructured data repositories contain essentially the same information;

receiving a query at the first computing system or a second computing system in communication with a first computing system;

automatically directing the query to either the structured repository or an unstructured repository;

searching the structured or the unstructured repositories in accordance with said automatically directing; and returning a result set to the query including at least a portion of the contents of at least one of the clusters.

8. The method of claim 7, wherein the structured repository comprises a relational database.

9. The method of claim 7, wherein the unstructured repository comprises an unstructured database.

10. The method of claim 7, wherein said automatically directing the query comprises determining whether searching the structured repository or searching the unstructured repository would be faster in view of the query and a measure of available resources.

11. The method of claim 7, wherein the hybrid distance measurement comprises a linearly weighted composite distance measurement based, at least in part, on cosine similarity.

* * * * *